United States Patent
Nguyen et al.

(10) Patent No.: US 12,400,089 B1
(45) Date of Patent: Aug. 26, 2025

(54) APPARATUS FOR CENTRALIZED HOUSING AND OPERATION OF RFID COMPONENTS FOR A WASTE OR RECYCLING SERVICES VEHICLE

(71) Applicant: WM Intellectual Property Holdings, L.L.C., Houston, TX (US)

(72) Inventors: Vu Nguyen, Houston, TX (US); Michael Nagy, Sacramento, CA (US)

(73) Assignee: WM Intellectual Property Holdings, L.L.C., Houston, TX (US)

( * ) Notice: Subject to any disclaimer, the term of this patent is extended or adjusted under 35 U.S.C. 154(b) by 0 days.

(21) Appl. No.: 18/776,529

(22) Filed: Jul. 18, 2024

Related U.S. Application Data

(60) Provisional application No. 63/527,515, filed on Jul. 18, 2023.

(51) Int. Cl.
*G06K 7/00* (2006.01)
*G06K 7/10* (2006.01)

(52) U.S. Cl.
CPC ....... *G06K 7/0008* (2013.01); *G06K 7/10376* (2013.01)

(58) Field of Classification Search
CPC .......... G06K 7/0008; G06K 7/10376
See application file for complete search history.

(56) References Cited

U.S. PATENT DOCUMENTS

| | | | |
|---|---|---|---|
| 5,119,894 A | 6/1992 | Crawford | |
| 5,230,393 A | 7/1993 | Mezey | |
| 5,565,846 A * | 10/1996 | Geiszler | B65F 1/1484 |
| | | | 177/139 |
| 7,511,611 B2 | 3/2009 | Sabino | |
| 7,728,730 B2 * | 6/2010 | Langlois | G06Q 10/08 |
| | | | 340/572.1 |
| 8,330,059 B2 | 12/2012 | Curotto | |
| 8,430,303 B1 * | 4/2013 | Sanders | G06Q 20/1085 |
| | | | 235/379 |
| 8,917,513 B1 * | 12/2014 | Hazzard | H05K 5/0208 |
| | | | 361/826 |
| 10,207,866 B1 | 2/2019 | Dunbar | |
| 10,633,180 B2 | 4/2020 | Salinas | |

(Continued)

FOREIGN PATENT DOCUMENTS

| | | |
|---|---|---|
| EP | 2169761 A2 | 3/2010 |
| EP | 2305578 A1 | 4/2011 |

(Continued)

OTHER PUBLICATIONS

English Translation of EP2305578A1.

(Continued)

*Primary Examiner* — Curtis J King
(74) *Attorney, Agent, or Firm* — Greenberg Traurig LLP

(57) ABSTRACT

An apparatus for centralized housing and operation of RFID components for a waste and/or recycling service vehicle is provided. The apparatus centralizes most or all the functional RFID-related components on a waste or recycling service vehicle. The vehicle can be equipped with RFID technology such as readers, antennas, processors, power modules (with or without batteries), cellular modems, and other related components that are bundled into a single RFID hub located on or within the vehicle.

12 Claims, 9 Drawing Sheets

(56) References Cited

U.S. PATENT DOCUMENTS

| | | | |
|---|---|---|---|
| 10,635,864 B2* | 4/2020 | Flood | G06V 10/10 |
| 11,315,085 B2 | 4/2022 | Candel et al. | |
| 11,519,740 B2* | 12/2022 | Rodoni | G01C 21/343 |
| 2006/0061481 A1 | 3/2006 | Kurple | |
| 2006/0127202 A1* | 6/2006 | Tryggvason | B65F 3/08 |
| | | | 414/407 |
| 2007/0057789 A1* | 3/2007 | Hamerly | G06Q 50/04 |
| | | | 340/572.1 |
| 2007/0262878 A1* | 11/2007 | Maruca | G06Q 10/087 |
| | | | 340/686.1 |
| 2008/0061125 A1* | 3/2008 | Langlois | G06Q 10/08 |
| | | | 340/572.1 |
| 2008/0061977 A1* | 3/2008 | Maruca | G06Q 10/0637 |
| | | | 340/572.1 |
| 2008/0093463 A1* | 4/2008 | Chang | G06K 19/0723 |
| | | | 235/492 |
| 2008/0169342 A1* | 7/2008 | Gonen | G06Q 10/00 |
| | | | 235/375 |
| 2009/0024479 A1* | 1/2009 | Gonen | B65F 1/1484 |
| | | | 705/14.1 |
| 2009/0078702 A1 | 3/2009 | Martin, Jr. | |
| 2011/0258128 A1* | 10/2011 | Hambleton | G06Q 30/02 |
| | | | 705/308 |
| 2011/0279245 A1* | 11/2011 | Hynes | G06K 17/0025 |
| | | | 358/1.6 |
| 2012/0010746 A1* | 1/2012 | Sundholm | B07C 5/3412 |
| | | | 700/226 |
| 2013/0169467 A1* | 7/2013 | Iagounov | G01S 13/04 |
| | | | 342/27 |
| 2014/0029198 A1* | 1/2014 | Lozon | G06F 1/16 |
| | | | 361/679.57 |
| 2016/0239689 A1* | 8/2016 | Flood | G06K 19/145 |
| 2019/0005507 A1* | 1/2019 | Rodoni | B09B 1/00 |
| 2019/0019167 A1* | 1/2019 | Candel | B65F 3/14 |
| 2019/0087790 A1* | 3/2019 | Flood | G06Q 50/00 |
| 2020/0189844 A1* | 6/2020 | Sridhar | G06Q 30/0226 |
| 2021/0188541 A1* | 6/2021 | Kurani | G06Q 30/0207 |
| 2022/0371058 A1* | 11/2022 | Williams | B07C 7/00 |
| 2024/0070844 A1* | 2/2024 | Lamb | G06V 20/52 |
| 2024/0169820 A1* | 5/2024 | O'Hagan | G06K 7/10 |

FOREIGN PATENT DOCUMENTS

| | | |
|---|---|---|
| EP | 3131034 A1 | 2/2017 |
| WO | 2013121370 A2 | 8/2013 |

OTHER PUBLICATIONS

English Translation of EP2169761A2.
English Translation of WO2013121370A2.
IV7 Vehicle Mount RFID Reader, Product Profile, Intermec by Honeywell, 2014; 2 pages.

\* cited by examiner

APPARATUS FOR CENTRALIZED HOUSING AND OPERATION OF RFID COMPONENTS FOR A WASTE OR RECYCLING SERVICES VEHICLE

RELATED APPLICATION

This application claims the benefit, and priority benefit, of U.S. Provisional Patent Application Ser. No. 63/527,515, filed Jul. 18, 2023, the disclosure and contents of which are incorporated by reference herein in their entirety.

FIELD OF THE INVENTION

Currently, waste and/or recycling service vehicles are equipped with RFID technology having multiple components such as readers, antennas, processors, power modules and other related components that are distributed to various locations on the vehicle. The RFID technology can be used, for example, to read RFID tags on customer waste containers.

Many of these components are connected via cable or wiring such as coaxial cable. Cable management is a significant concern. The distance between the components can lead to communications issues as well as exposure of the components and cabling to elements and other hazards. Also, each individual component is vulnerable to wear and tear as the vehicle performs its daily operations.

Improvements in this field of technology are therefore desired.

SUMMARY

The following presents a simplified summary of the disclosed subject matter in order to provide a basic understanding of some aspects thereof. This summary is not an exhaustive overview of the technology disclosed herein.

Various illustrative embodiments of an RFID reader apparatus are provided herein. Apparatus can include, without limitation, a housing, an RFID reader disposed within the housing and configured to read RFID signals from an RFID tag, an RFID antenna operatively attached to the RFID reader and extending at least partially outside of the housing, wherein the RFID antenna is configured to detect RFID signals from the RFID tag and communicate the signals to the RFID reader; a processor disposed within the housing and configured to receive, compute, analyze and summarize data points from the RFID reader and other data inputs from the apparatus; and a power management module disposed within the housing and configured to provide power to the RFID reader and the processor. The RFID reader apparatus can further include a battery backup module disposed within the housing and configured to provide backup power to the power management module. The RFID reader apparatus can also further include a secondary housing disposed within the housing, wherein the secondary housing is configured to house the power management module and the backup battery.

Various illustrative embodiments of an RFID reader system are also provided herein. The RFID reader system can include a waste or recycling collection vehicle and RFID reader apparatus that is removably attached to the waste or recycling collection vehicle. Apparatus can include, without limitation, a housing, an RFID reader disposed within the housing and configured to read RFID signals from an RFID tag, an RFID antenna operatively attached to the RFID reader and extending at least partially outside of the housing, wherein the RFID antenna is configured to detect RFID signals from the RFID tag and communicate the signals to the RFID reader; a processor disposed within the housing and configured to to receive, compute, analyze and summarize data points from the RFID reader and other data inputs from the apparatus; and a power management module disposed within the housing and configured to provide power to the RFID reader and the processor. The RFID reader apparatus can further include a battery backup module disposed within the housing and configured to provide backup power to the power management module. The RFID reader apparatus can also further include a secondary housing disposed within the housing, wherein the secondary housing is configured to house the power management module and the backup battery.

BRIEF DESCRIPTION OF THE DRAWINGS

A better understanding of the presently disclosed subject matter can be obtained when the following detailed description is considered in conjunction with the following drawings, wherein.

While certain preferred illustrative embodiments will be described herein, it will be understood that this description is not intended to limit the subject matter to those embodiments. On the contrary, it is intended to cover all alternatives, modifications, and equivalents, as may be included within the spirit and scope of the subject matter as defined by the appended claims.

DETAILED DESCRIPTION

Various illustrative embodiments of an apparatus for centralized housing and operation of RFID components for a waste and/or recycling service vehicle are provided herein.

In certain illustrative embodiments, the presently disclosed apparatus 10 seeks to centralize most or all of the functional RFID-related components on a waste or recycling service vehicle 5. Vehicle 5 can be equipped with RFID technology such as readers, antennas, processors, power modules (with or without batteries), cellular modems, and other related components that are bundled into a single RFID hub located on or within the vehicle and equipped with wifi, bluetooth or similar wireless technologies to connect to other peripheral devices, such as the onboard computer 80 of the vehicle 5.

The vehicle 5 can be configured to provide services to customers, which can include typical lines of waste industry services such as waste collection and transport and/or recycling for commercial, residential and/or industrial customers.

Figure 1:
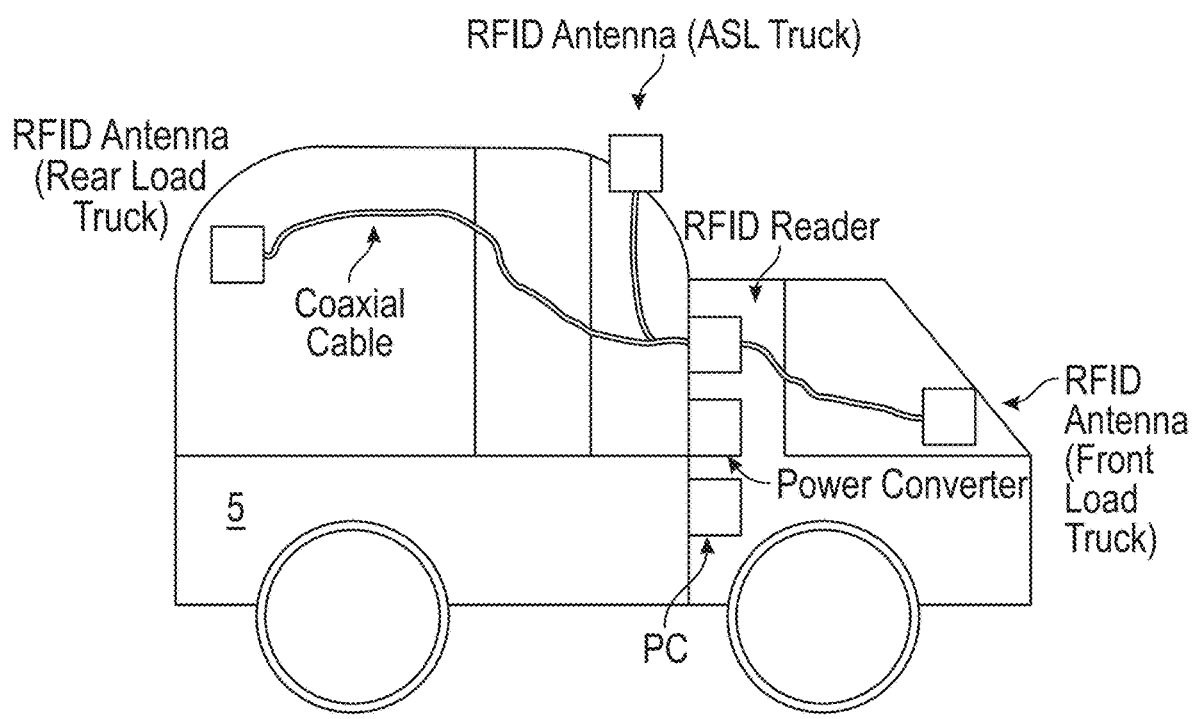
FIG. 1 is a side view of a waste or recycling services vehicle according to the prior art.

FIG. 1 shows a prior art configuration for RFID components in various different locations on the waste service vehicle 5. By comparison, FIG. 2-FIG. 12 show configurations for the presently disclosed apparatus 10, wherein most or all of the various RFID components are consolidated inside a single enclosed housing 20 on the waste service vehicle 5 for centralized housing and operation.

Figure 2:
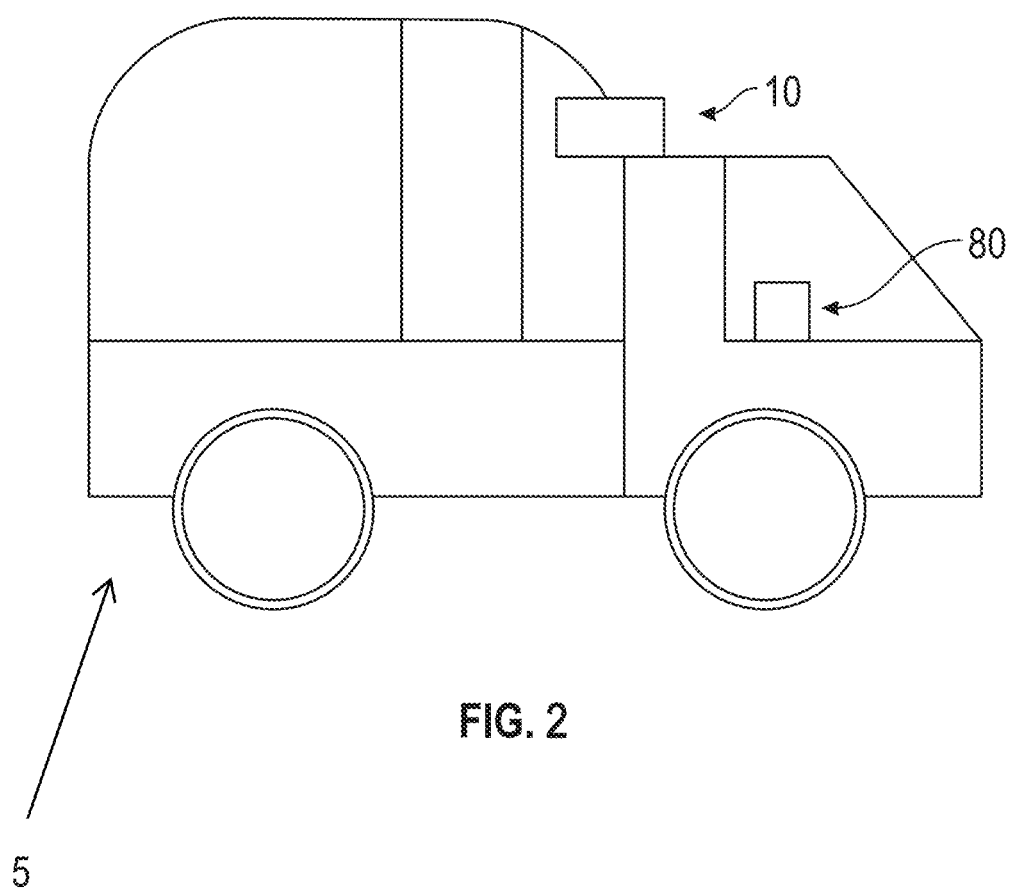
FIG. 2 is a side view of a waste or recycling services vehicle in accordance with an illustrative embodiment of the presently disclosed subject matter.
Figure 3:
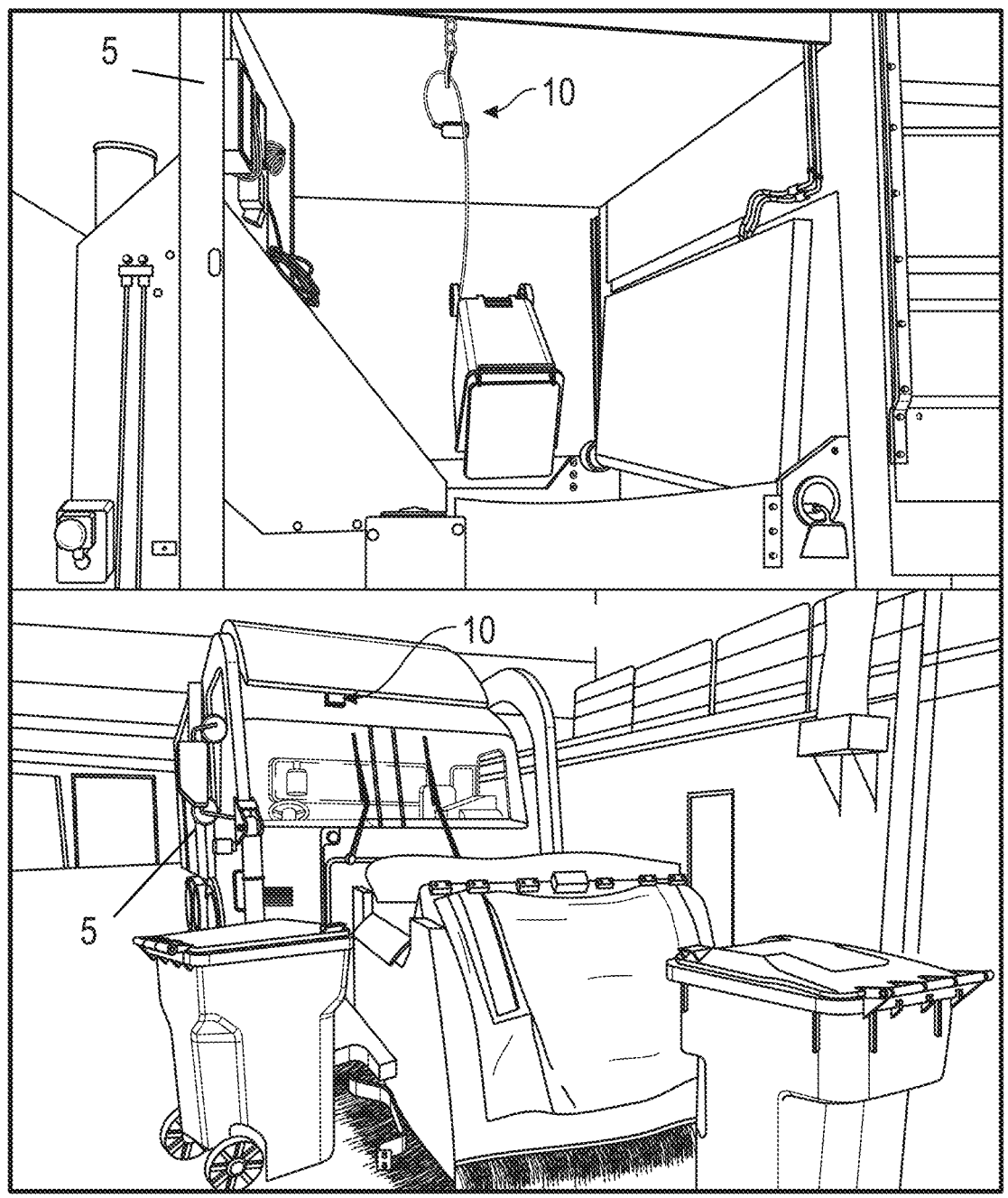
FIG. 3 is a pair of side perspective views of a waste or recycling services vehicle with an RFID reader apparatus in accordance with an illustrative embodiment of the presently disclosed subject matter.
Figure 4:
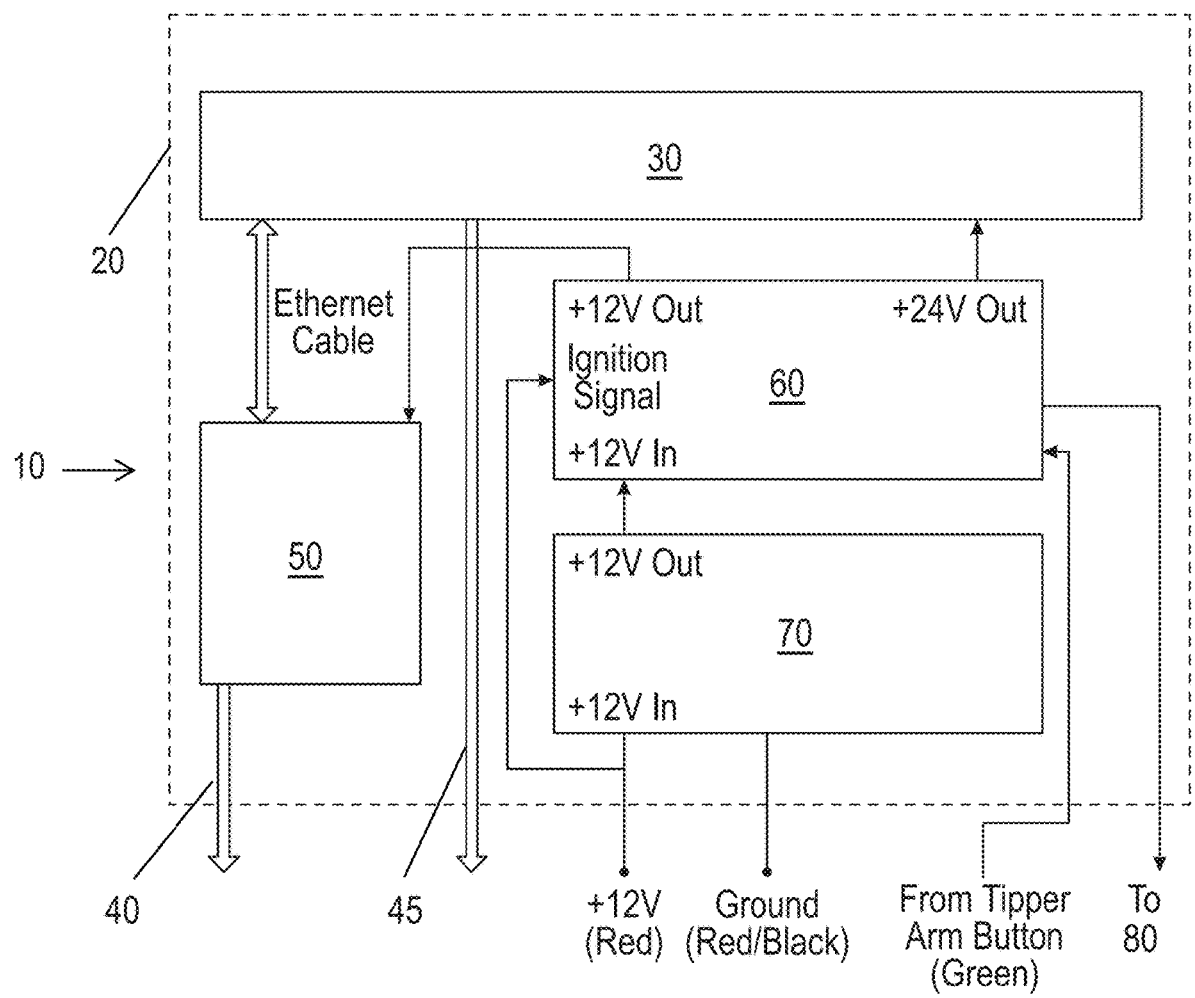
FIG. 4 is a layout of an RFID reader apparatus in accordance with an illustrative embodiment of the presently disclosed subject matter.
Figure 5:
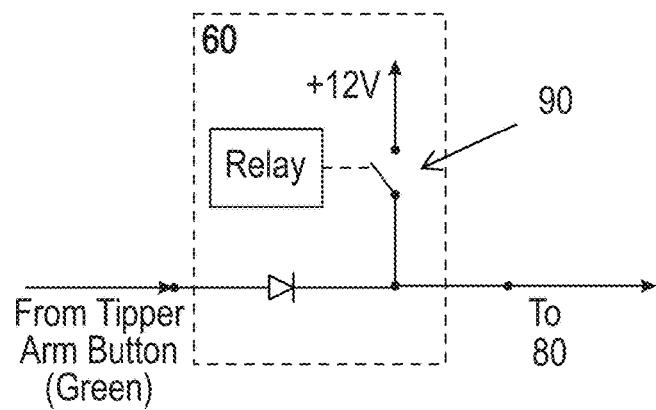
FIG. 5 is a layout of a trigger device for an RFID reader apparatus in accordance with an illustrative embodiment of the presently disclosed subject matter.

In certain illustrative embodiments, as shown in FIGS. 2-4, the centralized housing 20 of apparatus 10 can contain various RFID hardware components bundled into a single, enclosed unit and positioned on or inside vehicle 5. For example, as shown in FIG. 4, housing 20 of apparatus 10 can contain one or more of an RFID reader 30, one or more antennas 40, a processor (PC) 50, a power management module (PMM) 60, a battery backup 70, and other related cables and components. Some or all of these components can be disposed within housing 20, that is, enclosed within the hollow interior of the housing 20 to protect the components. Apparatus 10 can also be equipped with short range communication devices (such as wifi, NFC, Bluetooth, etc.,) in order to communicate with an onboard CPU device 80 located on the vehicle 5 as well as any other devices that the driver of vehicle 5 or another user may employ. Apparatus 10 can also include other equipment components as needed, including additional antennas or a wired connection to onboard power, depending on the configuration of vehicle 5.

In certain illustrative embodiments, apparatus 10 can be placed in a variety of locations on vehicle 5. Housing 20 of apparatus 10 can be a plastic, ruggedized box with a hollow interior that is compact, easily mounted, and functionally moveable, meaning it can be taken off from one location on vehicle 5 and moved to a different location on vehicle 5 easily. Housing 20 can have a hinged door so that the box can be opened or closed. Location of apparatus 10 can be dependent, for example, on the best location for the antennas 40 and cables. Apparatus 10 can be mounted to vehicle 5 by a plurality of bolts 55 (see FIG. 7), either on the exterior of vehicle 5, for example, near the hopper (see FIG. 3), or, for example, inside the cab of vehicle 5 near the driver (see FIG. 11).

In certain illustrative embodiments, apparatus 10 can include battery backup 70 that is operatively connected to, and can send signals to, power management module 60, which allows apparatus 10 to continue to operate and communicate any type of stored data if power management module 60 loses power, so as to not corrupt records or files with an abrupt cut apart. Battery backup 70 can be a separate device from power management module 60 (see FIG. 9), or battery backup 70 and power management module 60 can enclosed within a secondary housing 65 such that the combination of battery backup 70 and power management module 60 functionally comprise the same device (see FIG. 10).

In certain illustrative embodiments, power management module 60 of apparatus 10 can communicate with an ignition signal from vehicle 5 via a power input cord 75 and recognize when vehicle 5 is turned on or off, and then convert the power delivered from the 12/24 v system and batteries of vehicle 5 to a desired voltage, for example, from 12 volts to 24 volts, or as otherwise needed for the RFID reader 30 and the processor 50, to provide the needed power for both units. Power input cord 75 can also be used to provide other sensor inputs from vehicle 5 to apparatus 10.

In certain illustrative embodiments, the RFID reader 30 is operatively connected to the processor 50 by an Ethernet cable. Alternatively, RFID reader 30 could be a chip set that is located on the motherboard of processor 50, in which case, a secondary 24 volt power line or an Ethernet cable connecting the two devices would not be needed. An RFID antenna 40 can be connected to RFID reader 30 and used to read signals from an RFID tag on, for example, a customer waste container. RFID reader 30 can send a signal via a coaxial cable to RFID antenna 40, which emits a radio frequency which hits an RFID tag on the customer container. The tag reflects the signal to the antenna 40 and RFID reader 30.

In certain illustrative embodiments, processor 50 of apparatus 10 is a small, compact computing device having a CPU, RAM memory, a modem on the board, Bluetooth capabilities, etc. A PC antenna 45 can be connected to processor 50 to provide LTE and GPS connectivity. Processor 50 is the computer system that houses the algorithm/software that processes the information for RFID reader 30 and also has the ability to communicate via cellular LTE connection to send the data/information to a cloud database. Processor 50 also has the ability to take in other data inputs and perform analysis and correlation on that data.

In certain illustrative embodiments, both the RFID antenna 40 and PC antenna 45 of apparatus 10 can extend outwardly such that a portion of one or both antennas is exposed outside of housing 20. The amount of exposure can vary, from a few feet up to 15 feet, depending on the style of install for vehicle 5. Alternatively, on certain installs such as a rear loader for vehicle 5, the PC antenna 45 can be attached to the internal wall of housing 20, such that only the RFID antenna 40 is exposed outside of housing 20, or both the PC antenna 45 and the RFID antenna 40 are attached to the internal wall of housing 20, such that no antenna are exposed outside of housing 20.

Figure 6:
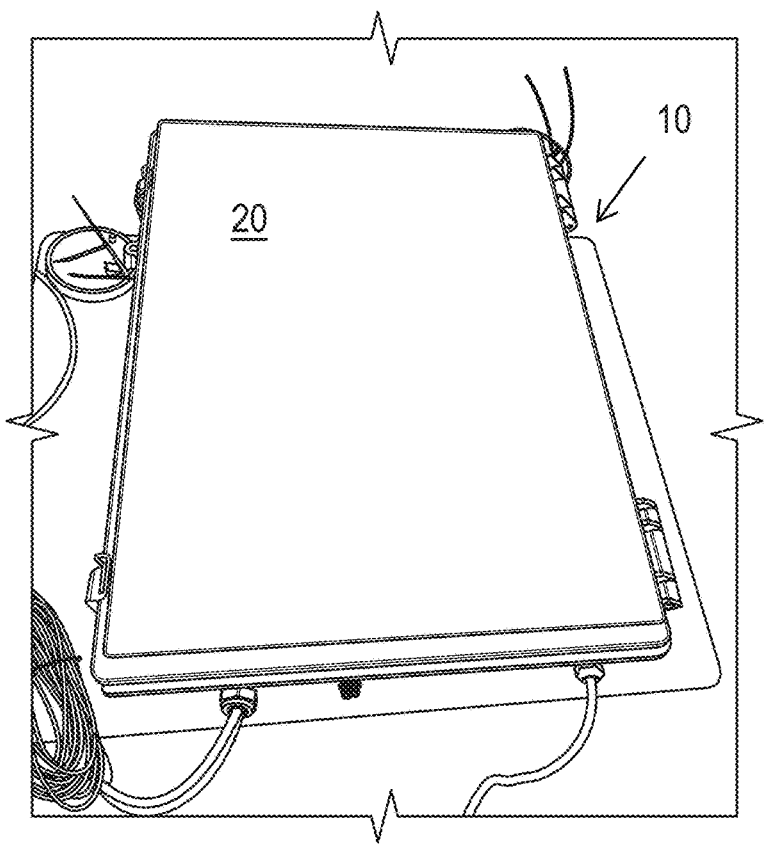
FIG. 6 is a top view of an RFID reader apparatus in accordance with an illustrative embodiment of the presently disclosed subject matter.
Figure 7:
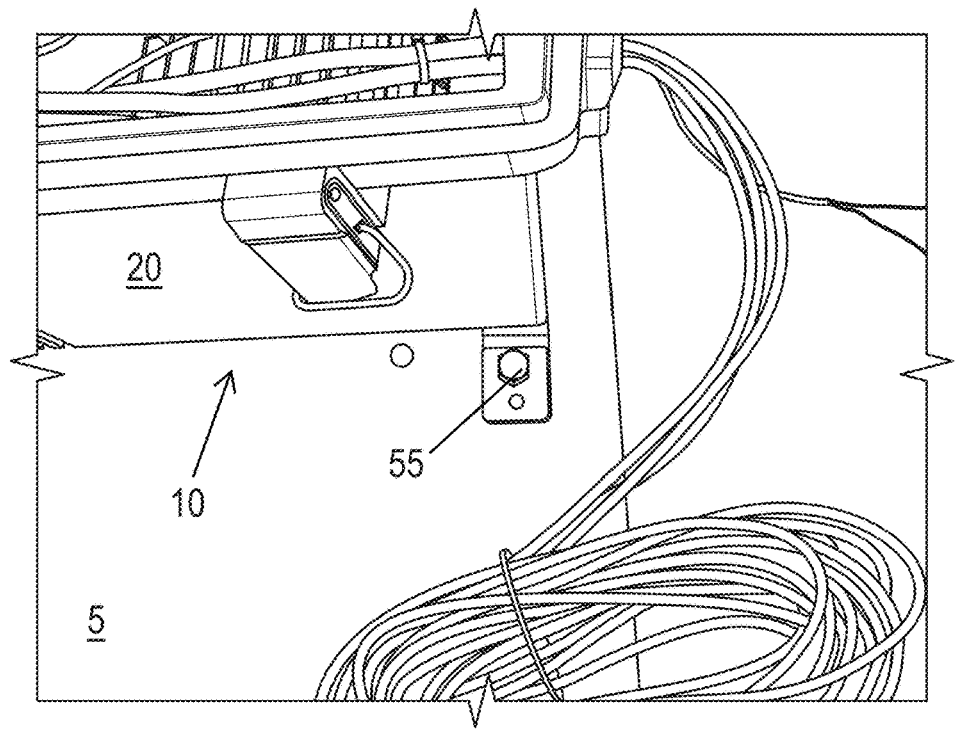
FIG. 7 is a top view of an RFID reader apparatus secured to a vehicle in accordance with an illustrative embodiment of the presently disclosed subject matter.
Figure 8:
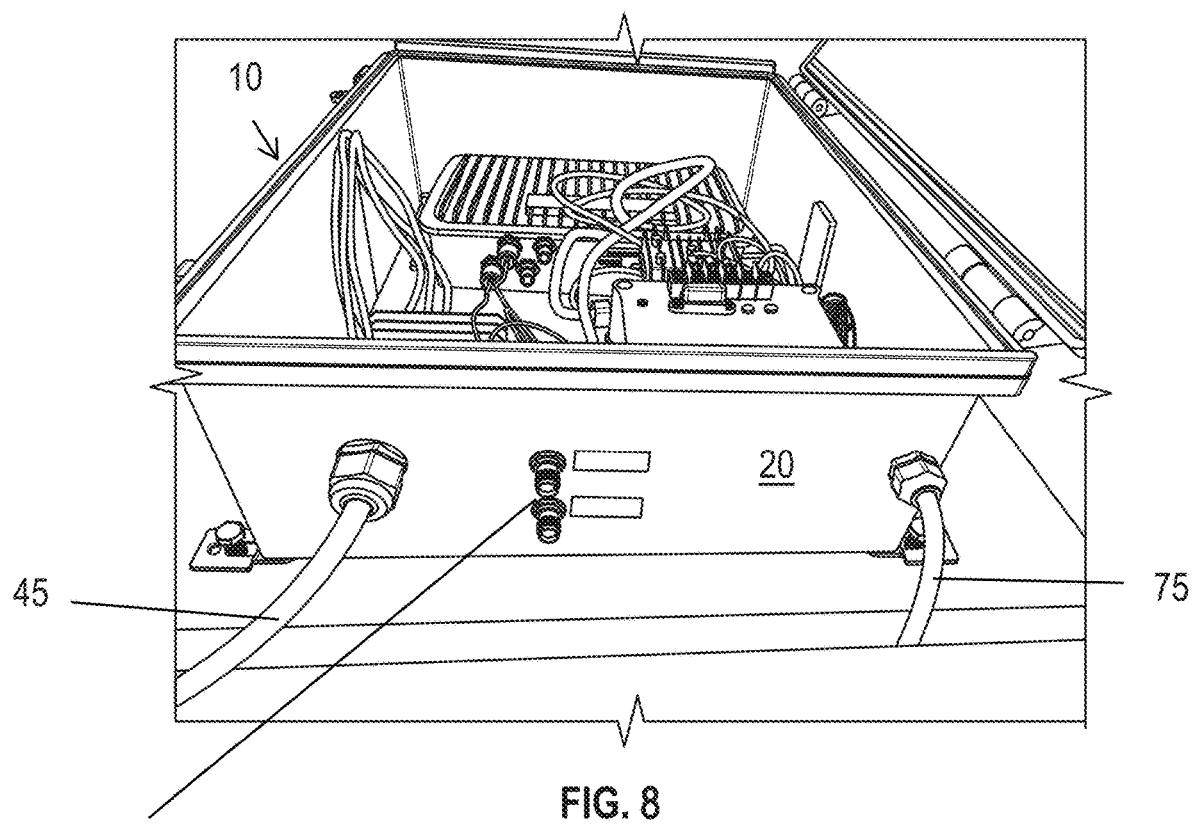
FIG. 8 is a side perspective view of the open enclosure of an RFID reader apparatus and its contents in accordance with an illustrative embodiment of the presently disclosed subject matter.
Figure 9:
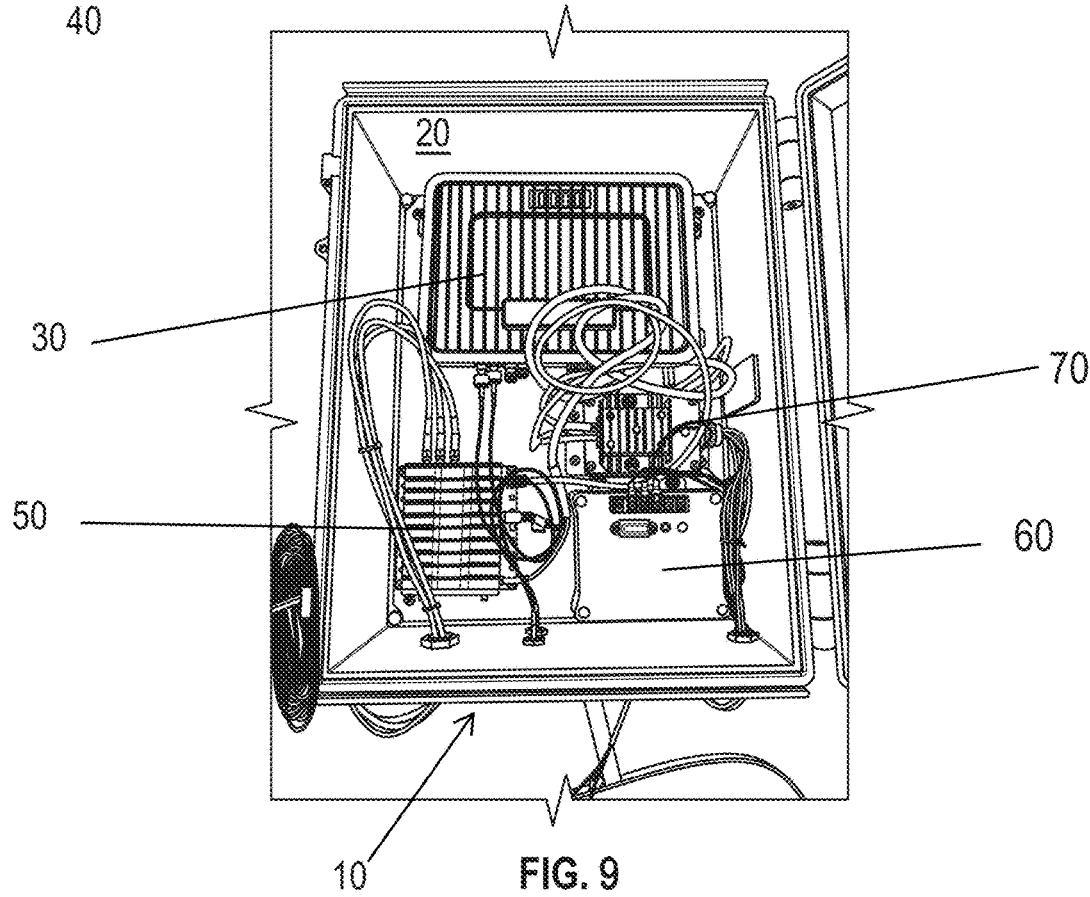
FIG. 9 is a top perspective view of the open enclosure of an RFID reader apparatus and its contents in accordance with an illustrative embodiment of the presently disclosed subject matter.

In certain illustrative embodiments, as shown in FIG. 6, apparatus 10 can be operationally connected to a trigger device 90 that sends and receives signals associated with apparatus 10. For example, trigger device 90 can be housed within power management module 60, and can be configured to capture any kind of signal that comes off one or more components of vehicle 5 such as a lift arm or hopper. If vehicle 5 is, for example, a rear loader or side loader, an operator of the vehicle 5 can activate the tipping of the hopper with a button such as an inclination switch or a proximity switch. When the button is pressed, it will also trigger the trigger device 90 which will send a signal to a processor and/or one or more sensors such as cameras on vehicle 5 to begin capturing images and/or videos of or relating to customer service events. Thus, apparatus 10 can be used as a hard hardware input to control and initiate action on other devices on vehicle 5. The input signal to trigger device 90 can be a signal of hot/cold, and when passing through trigger device 90 goes from 0 volts to 12 volts. As a result of the change in voltage, a relay is triggered and a signal is sent to the separate system. While input via pressing of a button is described herein, the input signal can also come from any other physical connection or wireless connection such as, e.g., wifi or Bluetooth, as would be understood by a person of ordinary skill in the art.

In certain illustrative embodiments, trigger device 90 can help to reduce or eliminate recording of duplicate events by a down stream sensor such as a camera. For example, if vehicle 5 attempts to dump trash from a container into a hopper of vehicle 5, and the container contains materials that require shaking the container (for example, stuffed pillows), the resulting movement of the lift arm could create a series of multiple potential movement events or camera/video images to be recorded. The user may only want to capture images of the initial tip event, but the additional movement could mean that captured content will be 5 to 10 times more that what is desired, which wastes resources.

Alternatively, in certain illustrative embodiments, the presently disclosed apparatus 10 allows a user to send the information up to the power management module 60, such that the information can be shared with both the processor 50 and the trigger device 90, which will send the signal to a separate system. As a result, one signal is triggering two different systems at the same time, which allows for matching of data by event. For example, the information from the separate systems can be compared and synchronized to match up the events that occurs on the RFID reader 30 and the event that occurs on the other system.

Figure 10:
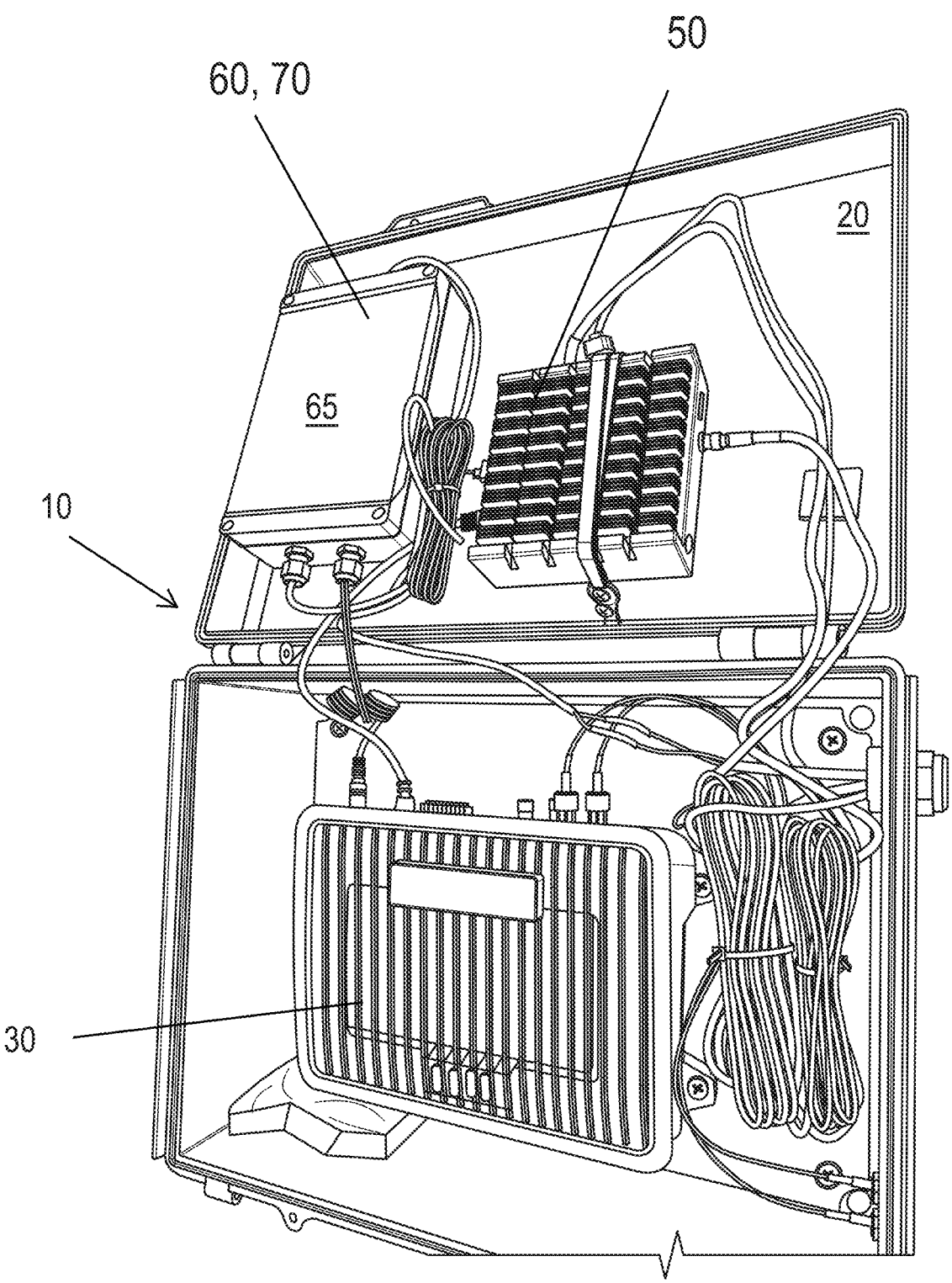
FIG. 10 is a top perspective view of the open enclosure of an RFID reader apparatus and its contents in accordance with an illustrative embodiment of the presently disclosed subject matter.
Figure 11:
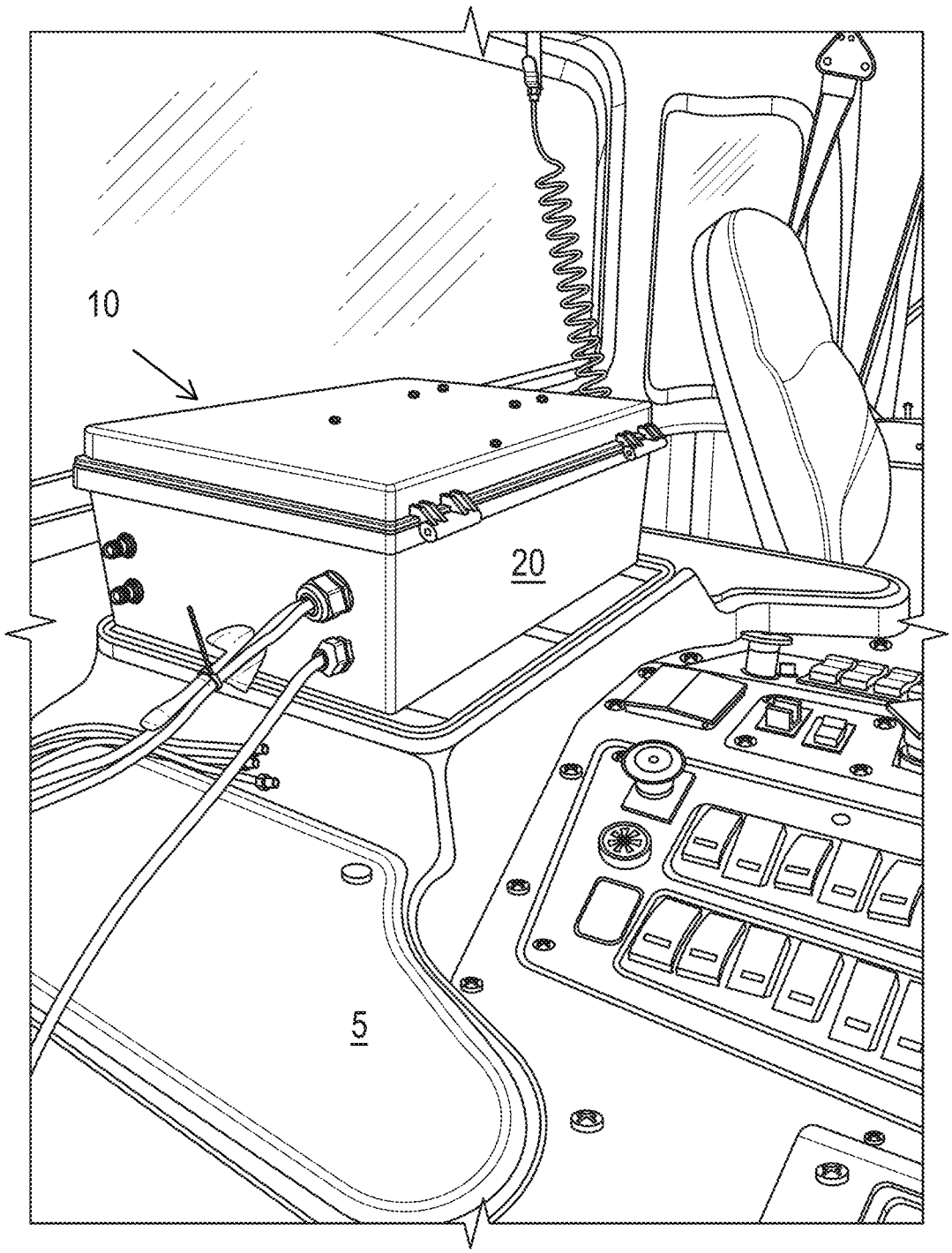
FIG. 11 is a side perspective view of an RFID reader apparatus located in the cab of a vehicle accordance with an illustrative embodiment of the presently disclosed subject matter.
Figure 12:
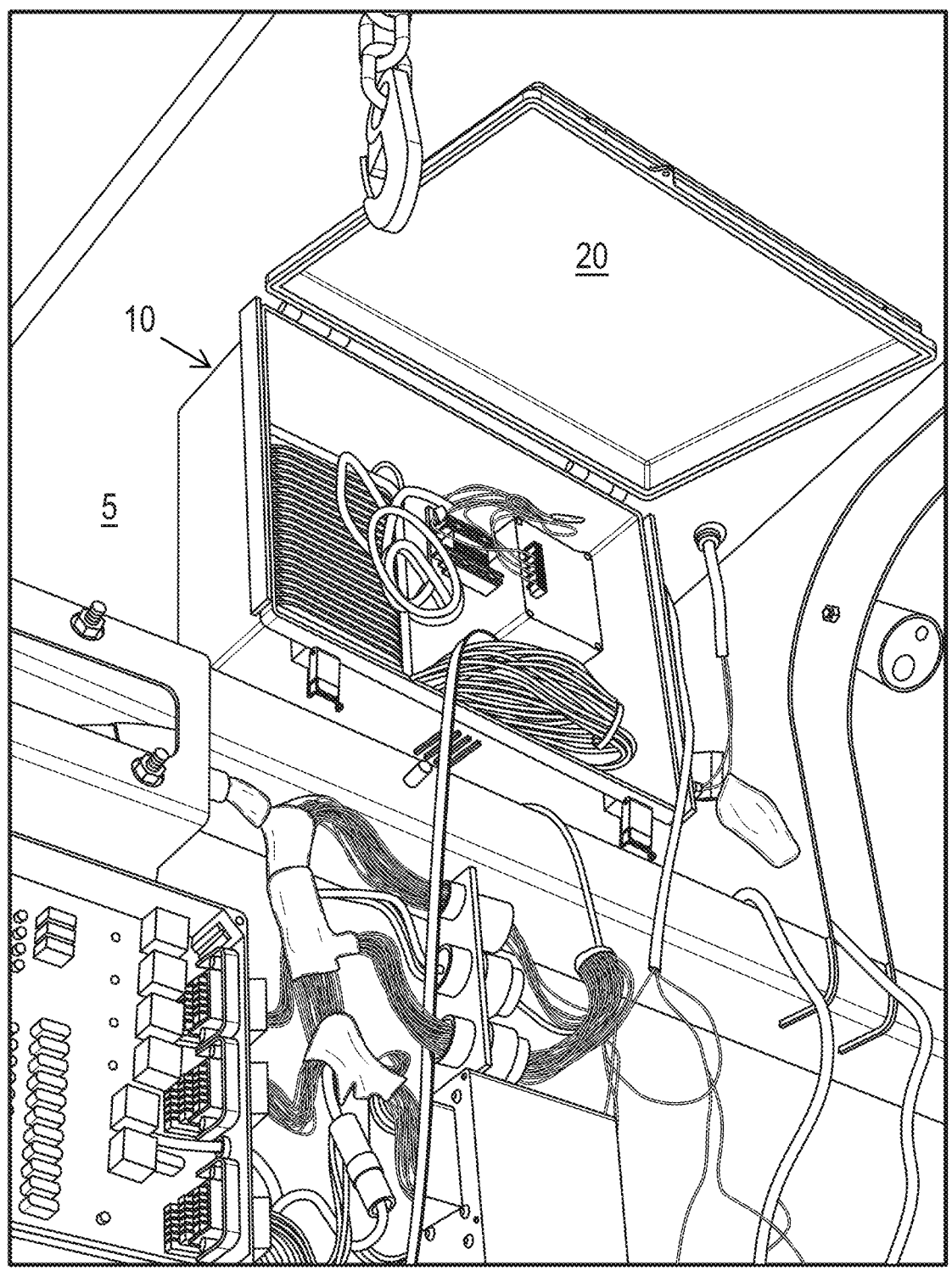
FIG. 12 is a side perspective view of an RFID reader apparatus located in a manual side loader vehicle in accordance with an illustrative embodiment of the presently disclosed subject matter.

FIG. 10 shows an illustrative embodiment with housing 20 that includes the RFID reader 30, processor 50, power management module (PMM) 60, battery backup 70, and all connections. FIG. 11 shows an illustrative embodiment with the same apparatus 10 as FIG. 10, but the location of the apparatus 10 is inside the cab of the vehicle 5 as would be used for a Curotto-Can® type vehicle 5. FIG. 12 shows an illustrative embodiment with apparatus 10 mounted on an manual side loader ("MSL") waste vehicle 5. This configuration has the same components as the other installs but in a larger housing 20 resulting in a different layout of the components inside housing 20.

In certain illustrative embodiments, apparatus 10 is not a separate structure attached onto an outer surface of the vehicle 5. Instead, a hollow compartment is formed within the wall of vehicle 5, and RFID reader 30, processor 50, power management module (PMM) 60, battery backup 70, and various connections all sit within the hollow compartment. In other words, apparatus 10 sits within the body of vehicle 5. A door, for example, can be used to enclose these components within the hollow compartment, and the door and hollow compartment comprise housing 30. This configuration can be used, for example, with an automatic side loader ("ASL") install. The locations of each component, as well as the wiring paths, may change between each vehicle 5 due to uniqueness (see, e.g., FIG. 10 where some components are mounted on door vs. FIG. 20 where all components are located inside hollow compartment) but the main functionality of the components can be the same.

Various illustrative embodiments of an RFID reader apparatus 10 are provided herein. Apparatus 10 can include, without limitation, a housing 20, an RFID reader 30 disposed within the housing 20 and configured to read RFID signals from an RFID tag, an RFID antenna 45 operatively attached to the RFID reader 30 and extending at least partially outside of the housing 20, wherein the RFID antenna 45 is configured to detect RFID signals from the RFID tag and communicate the signals to the RFID reader 30; a processor 50 disposed within the housing 20 and configured to receive, compute, analyze and summarize data points from the RFID reader 30 and other data inputs from the apparatus 10; and a power management module 60 disposed within the housing 20 and configured to provide power to the RFID reader 30 and the processor 50. The RFID reader apparatus 10 can further include a battery backup module 70 disposed within the housing 20 and configured to provide backup power to the power management module 60. The RFID reader apparatus 10 can also further include, as shown in FIG. 10, a secondary housing 65 disposed within the housing 20, wherein the secondary housing 65 is configured to house the power management module 60 and the backup battery 70.

Various illustrative embodiments of an RFID reader system are also provided herein. The RFID reader system can include the waste or recycling collection vehicle 5 and RFID reader apparatus 10 that is removably attached to the waste or recycling collection vehicle 5. Apparatus 10 can include, without limitation, a housing 20, an RFID reader 30 disposed within the housing 20 and configured to read RFID signals from an RFID tag, an RFID antenna 45 operatively attached to the RFID reader 30 and extending at least partially outside of the housing 20, wherein the RFID antenna 45 is configured to detect RFID signals from the RFID tag and communicate the signals to the RFID reader 30; a processor 50 disposed within the housing 20 and configured to receive, compute, analyze and summarize data points from the RFID reader 30 and other data inputs from the apparatus 10; and a power management module 60 disposed within the housing 20 and configured to provide power to the RFID reader 30 and the processor 50. The RFID reader apparatus 10 can further include a battery backup module 70 disposed within the housing 20 and configured to provide backup power to the power management module 60. The RFID reader apparatus 10 can also further include, as shown in FIG. 10, a secondary housing 65 disposed within the housing 20, wherein the secondary housing 65 is configured to house the power management module 60 and the backup battery 70.

The presently disclosed apparatus and system have a number of advantages over previous designs. For example, the long runs of exposed cables in prior designs can cause operational maintenance issues due to damage or kinks which can cause degradation and reduced signal quality, so improved cable maintenance is a benefit. Also, the presently disclosed apparatus and system can enable a user to consolidate the components into a single, ruggedized equipment housing to minimize potential for damage and to eliminate the need for cables to be run through various parts of the vehicle, as well as reduction of installation and maintenance time and complexity.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. As used herein, the term "A and/or B" means embodiments having element A alone, element B alone, or elements A and B taken together.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the non-provisional claims.

What is claimed is:

1. An RFID reader apparatus, comprising:
a housing;
an RFID reader disposed within the housing and configured to read RFID signals from an RFID tag;
an RFID antenna operatively attached to the RFID reader and extending at least partially outside of the housing, wherein the RFID antenna is configured to detect RFID signals from the RFID tag and communicate the signals to the RFID reader;
a processor disposed within the housing and configured to receive data from the RFID reader;
a power management module disposed within the housing and configured to provide power to the RFID reader and the processor; and
a trigger device disposed within the housing and configured to communicate with one or more equipment components located on a waste or recycling collection vehicle, and wherein the power management module is configured to deliver a single signal that initiates activity of both the RFID reader and the trigger device.

2. The RFID reader apparatus of claim 1, further comprising: a battery backup module disposed within the housing and configured to provide backup power to the power management module.

3. The RFID reader apparatus of claim 2, further comprising: a secondary housing disposed within the housing, the secondary housing configured to house the power management module and the backup battery.

4. An RFID reader system, comprising:
a waste or recycling collection vehicle; and
an RFID reader apparatus removably attached to the waste or recycling collection vehicle, the RFID reader apparatus comprising:
a housing;
an RFID reader disposed within the housing and configured to read RFID signals from an RFID tag;
an RFID antenna operatively attached to the RFID reader and extending at least partially outside of the housing, wherein the RFID antenna is configured to detect RFID signals from the RFID tag and communicate the signals to the RFID reader;
a processor disposed within the housing and configured to receive data from the RFID reader;
a power management module disposed within the housing and configured to provide power to the RFID reader and the processor; and
a trigger device disposed within the housing and configured to communicate with one or more equipment components located on a waste or recycling collection vehicle, and wherein the power management module is configured to deliver a single signal that initiates activity of both the RFID reader and the trigger device.

5. The RFID reader apparatus of claim 1, wherein the housing is disposed inside a cab of a waste or recycling collection vehicle.

6. The RFID reader apparatus of claim 1, wherein the housing is mounted on an exterior surface of a waste or recycling collection vehicle.

7. The RFID reader apparatus of claim 1, further comprising a short-range communication device disposed within the housing and configured to communicate with an onboard computing device located on a waste or recycling collection vehicle.

8. The RFID reader apparatus of claim 1, wherein the apparatus is configured to be moveable from a first location on a waste or recycling collection vehicle to a second location on a waste or recycling collection vehicle.

9. The RFID reader system of claim 4, wherein the housing is disposed inside a cab of the waste or recycling collection vehicle.

10. The RFID reader system of claim 4, wherein the housing is mounted on an exterior surface of the waste or recycling collection vehicle.

11. The RFID reader system of claim 4, further comprising a short-range communication device disposed within the housing and configured to communicate with an onboard computing device located on the waste or recycling collection vehicle.

12. The RFID reader system of claim 4, wherein the apparatus is configured to be moveable from a first location on the waste or recycling collection vehicle to a second location on the waste or recycling collection vehicle.

* * * * *